United States Patent [19]

Kubik

[11] Patent Number: 5,101,544
[45] Date of Patent: Apr. 7, 1992

[54] APPARATUS AND METHOD FOR REGULATING TEMPERATURE IN A FLEXURE-CONTROLLABLE ROLL

[75] Inventor: Klaus Kubik, Krefeld, Fed. Rep. of Germany

[73] Assignee: Eduart Küsters Maschinenfabrik GmbH & Co. KG, Krefeld, Fed. Rep. of Germany

[21] Appl. No.: 422,029

[22] Filed: Oct. 16, 1989

[30] Foreign Application Priority Data

Oct. 15, 1988 [DE]   Fed. Rep. of Germany ....... 3835152

[51] Int. Cl.$^5$ ............................................. B21B 13/02
[52] U.S. Cl. ................................. 29/116.2; 165/89; 384/99; 384/313; 100/162 B
[58] Field of Search ............... 29/113.1, 113.2, 116.1, 29/116.2; 165/89, 90; 384/99, 100, 116, 313, 317, 321; 100/93 RP, 162 B

[56] References Cited

U.S. PATENT DOCUMENTS

| | | | |
|---|---|---|---|
| 3,802,044 | 4/1974 | Spillman et al. | 29/113.2 |
| 4,282,639 | 8/1981 | Christ et al. | 100/162 B X |
| 4,328,744 | 5/1982 | Pav et al. | 29/116.2 X |
| 4,394,793 | 7/1983 | Pav et al. | 29/116.2 |
| 4,474,483 | 10/1984 | Suzuki et al. | 384/114 |
| 4,729,153 | 3/1988 | Pav et al. | 29/116.2 |
| 4,813,349 | 3/1989 | Pav et al. | 100/162 B |
| 4,841,610 | 6/1989 | Quehen | 29/116.2 |
| 4,856,157 | 8/1989 | Küsters | 29/116.2 |
| 4,955,120 | 9/1990 | Brendel et al. | 29/116.2 X |

FOREIGN PATENT DOCUMENTS

| | | |
|---|---|---|
| 0237437 | 9/1987 | European Pat. Off. |
| 1193792 | 5/1965 | Fed. Rep. of Germany |
| 2230139 | 1/1973 | Fed. Rep. of Germany |
| 2942002 | 7/1980 | Fed. Rep. of Germany |
| 2902956 | 6/1982 | Fed. Rep. of Germany |
| 2946471 | 10/1984 | Fed. Rep. of Germany |
| 3611858 | 10/1987 | Fed. Rep. of Germany |

OTHER PUBLICATIONS

Derwent Abstract of DE 2946471.

*Primary Examiner*—Joseph M. Gorski
*Assistant Examiner*—S. Thomas Hughes
*Attorney, Agent, or Firm*—Kenyon & Kenyon

[57] ABSTRACT

A flexure-controllable roll includes a hollow roll, a stationary crosshead extending lengthwise therethrough and hydrostatic support elements arranged in the clearance space between the hollow roll and crosshead. The support elements are formed with contact surfaces for abutting the inner circumference of the hollow roll. Hydrostatic bearing pockets are formed in the contact surfaces. The bearing pockets are supplied with a first pressurized fluid via throttling ports from a cylinder chamber of the support element. An additional feed line, provided in the crosshead, has a movable part that follows the movements of the support element for supplying a second pressurized fluid to the bearing pockets for regulating the temperature of the roll.

12 Claims, 5 Drawing Sheets

APPARATUS AND METHOD FOR REGULATING TEMPERATURE IN A FLEXURE-CONTROLLABLE ROLL

BACKGROUND OF THE INVENTION

The invention relates generally to flexure-controllable rolls for treating webs of material and, more particularly, to an improved apparatus and method for regulating temperature in flexure-controllable roll having hydrostatic support elements.

In DE-OS 2230139, a flexure-controllable roll is disclosed having a rotatable hollow roll forming the working roll circumference and a stationary crosshead extending lengthwise through the roll to form a surrounding clearance space with the inner circumference of the hollow roll. Piston-type hydraulic support elements are guided for movement in respective cylinder bores of the crosshead. From a cylinder chamber formed under each support element, throttling ports lead into bearing pockets formed in the contact surface of each support element that abuts the inner circumference of the hollow roll. The pressurized fluid supplied to the cylinder chamber flows via the throttling ports into the bearing pockets and over the edges of the bearing pockets into the clearance space between the inner circumference of the hollow roll and the crosshead. Thus, a continuously replenished liquid film develops between the edges of the bearing pockets and the inner circumference of the hollow roll. In this manner, both the center and edge regions of the bearing pockets of the support element are braced against the inner circumference of the hollow roll by the pressurized fluid.

As the pressure in the bearing pockets may be quite high, the pressurized fluid supplied to the bearing pockets flows from the bearing pockets to the outside under high pressure via the very narrow gap formed between the edges of the bearing pockets and the inner circumference of the hollow roll, as noted above. The pressurized fluid becomes heated as it flows from the bearing pockets, while the temperature of the hollow roll is determined mainly by the pressurized fluid supplied to the cylinder chambers of the piston/cylinder units of the support elements, additional heat generated by the fluid friction of the pressurized fluid flowing from the edges of the bearing pockets can result in a noticeable, non-uniform temperature distribution along the length of the hollow roll. The temperature of the hollow roll rises somewhat in the area of the support elements. This may have not only undesirable direct consequences for the treatment of the web, i.e. with respect to temperature, but also indirect consequences, such as the diameter of the hollow roll being increased by thermal expansion in the area of the support elements.

It can be proven that the frictional work occurring at individual support elements having equal gap height h, i.e., equal thickness of the fluid film between the edge of the bearing pockets and the inner circumference of the hollow roll, as the pressurized fluid flows from the bearing pocket, is, in principle, the same. However, there are some second order interference parameters that have a disrupting influence on the prevailing temperature.

At different pressures and constant gap height, different quantities of fluid flow from the pockets. If the frictional work—theoretically equal for all of the support elements—acts upon a small amount of liquid as it flows from the bearing pockets at low pressures, a more intensive heating will occur than if the same frictional work distributes itself over a large amount of liquid, which then is heated to a lesser degree. Furthermore, as the pressurized fluid flows through the narrow gap, hydraulic energy released at the support element is transformed into heat. In addition, the change in viscosity that occurs at the edges of the bearing pockets, due to heating of the pressurized fluid during flow through the gap, also has an effect. Lastly, another factor is speed. At slow speeds, although the oil in the gap may indeed be hotter than at faster speeds, the heat transfer is less. At greater speeds, the oil in the gap does not become as hot, but it transfers more heat to the inner circumference of the hollow roll because of its higher flow velocity.

All of the above effects are particularly significant in disrupting the existing temperature distribution when the line force distribution is changed. That is, the temperature distribution is no longer independent of the line force distribution if a variation in the force exerted by an individual support element necessarily changes the temperature in the area of this support element as well. The totality of all of the effects discussed above is encompassed by the term "fluid friction".

SUMMARY OF THE INVENTION

Thus, one of the problems to which the invention is directed is to provide a flexure-controllable roll in which the disadvantageous effects of the additional heating caused by fluid friction are eliminated.

This problem is solved by the provision of a flexure-controllable roll in which a rotatable hollow roll forms a working roll circumference and a stationary crosshead extends lengthwise through the hollow roll to form a surrounding clearance space between an inner circumference of the hollow roll and the crosshead. A plurality of hydrostatic support elements are arranged along the crosshead and have contact surfaces that conform to the inner circumference of the hollow roll. At least one piston/cylinder unit, including a piston and cylinder chamber, cooperates with each hydrostatic element for radially displacing it relative to the crosshead such that its contact surface abuts the inner circumference of the hollow roll when under the influence of a first pressurized fluid in the cylinder chamber. At least one bearing pocket is formed in each contact surface and a first throttling port is in fluid communication with its respective associated bearing pocket and cylinder chamber for supplying the first pressurized fluid to its respective bearing pocket. A separate feed line is provided for each support element and a second throttle port is in fluid communication with its respective bearing pocket and separate feed line for supplying a second pressurized fluid to its respective bearing pocket.

Beside the normal first throttling ports, through which the main quantity of pressurized fluid may be supplied to the bearing pockets, the second throttle port can supply additional amounts of pressurized fluid independently to the bearing pockets These additional amounts may be colder than the main quantity such that the additional heating effects resulting from flow through the gap at the edges of the bearing pockets can be neutralized. This may be carried out in such a manner that the exertion of pressure by the support element against the inner circumference of the hollow roll is not influenced. To achieve this, the separate feed line must be able to move relative to the crosshead because of the mobility of support elements relative to the crosshead. However, the invention does not require the additional pressurized fluid to be colder than the main quantity and generally covers the supply of any additional pressurized fluid including, if necessary, a warmer one.

Provision of two separate feed lines at the support element of a rotatable hollow roll is disclosed, per se, in DE-AS 1193792. However, in this publication, a different type of support element is disclosed. The pressurized fluid that causes abutment of the support element is not simultaneously used to fluidically support the support element at the inner circumference of the hollow roll. Instead, a first pressurized fluid is supplied to a closed cylinder chamber for pressing the support element against the inner circumference of the hollow roll and a second pressurized fluid is supplied to the bearing pockets. Contrary to the present invention in which two different pressurized fluids are supplied to each bearing pocket, only the second pressurized fluid is communicated to the bearing pockets.

The specific construction of the separate feed line of the invention, which is arranged between the crosshead and the movable support element, may vary. For example, the feed line may comprise a movable, flexible tube or a telescoping arrangement. The telescoping arrangement may be formed as part of an additional piston/cylinder unit separately actuatable with pressurized fluid. One of the additional piston and cylinder is connected with the support element, while the other is connected with the crosshead. The side of the support element facing the crosshead includes a slidable tubular projection, which sealingly extends into a bore provided at the crosshead that communicates with the feed line.

To provide additional pressurized fluid to a plurality of adjacent bearing pockets formed in the contact surface of each support element, a common feed line may be provided. The feed line extends into a web section formed between the bearing pockets and communicates with the pockets via lateral throttle ports.

The invention arose as a solution to the problem of preventing variations in the actual temperature distribution of a flexure-controllable roll upon the occurrence of a pressure change. According to the invention, this problem is solved by mixing the first pressurized fluid supplied to the bearing pockets for the formation of the line force with another pressurized fluid having a different temperature than that of the first pressurized fluid. In one embodiment of the invention, this may be accomplished by provision of a flow regulator, which controls the amount of additional pressurized fluid supplied to the bearing pockets. A heat exchanger maintains the additional fluid at a predetermined constant temperature, which differs from the temperature of the first, line force-generating, pressurized fluid. Alternatively, the temperature of the additional pressurized fluid may be regulated, i.e., the additional fluid may be supplied at a constant rate of flow (constant amount of fluid per unit of time) and its temperature may be regulated. Naturally, a combination of both of these two types of control may be employed.

In the simplest form of the invention, the regulators may be manually operated; for example, via shift members that are assigned to each individual support element or to a group of support elements. Alternatively, a temperature sensor system may be provided to monitor the temperature distribution of the roll and control, via a corresponding computer program (previously determined empirically or mathematically), the flow of additional pressurized fluid of different temperature supplied to the bearing pockets when a deviation from a desired temperature distribution is sensed.

By providing a computer, the automation may be extended even further. A previously entered, empirically or mathematically determined computer program, accounts for the undesired temperature changes brought about by a pressure change and, accordingly, controls the compensatory measures necessary, i.e., the amount of additional pressurized fluid having a different, but constant temperature to be added or the temperature of additional pressurized fluid of constant flow to be added.

According to another aspect of the invention, a method of regulating the temperature distribution of a flexure-controllable roll is disclosed in which a second pressurized fluid having a different temperature than the first fluid is supplied to the bearing pockets to compensate for the effects of "fluid friction". One advantage of this method is that only the relatively small amount of the second pressurized fluid must be regulated and not the much larger amount of the first pressurized fluid supplied to the bearing pockets of the support elements for generating the line force distribution.

Further features, advantages and embodiments of the invention are apparent from consideration of the following detailed description, drawings and appended claims.

DETAILED DESCRIPTION

Figure 1:
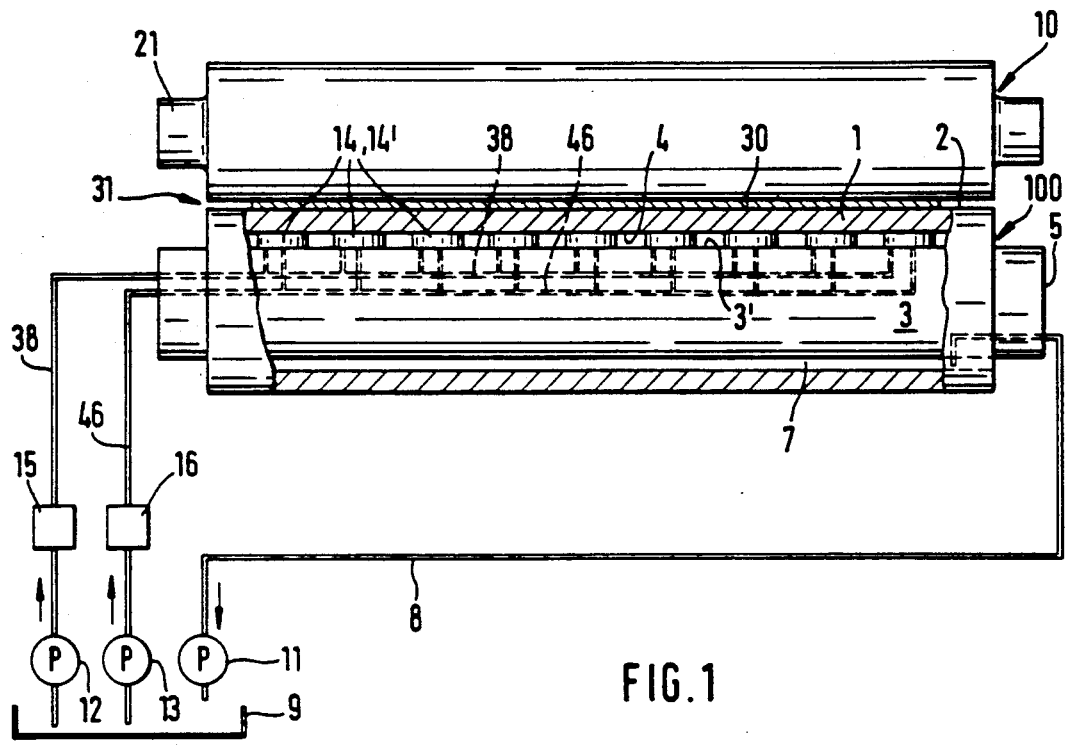
FIG. 1 illustrates a pair of rolls in which the bottom roll is constructed according to the principles of the invention.

The roll pair illustrated in FIG. 1 comprises a top roll 10 and a bottom roll 100, which form a roll nip 31 through which a web of material 30 is conducted for pressure treatment therein. The top roll 10 may be a conventional solid roll. The bottom roll 100 includes a rotatable hollow roll 1 whose outer circumference 2 forms the working roll circumference. A stationary crosshead 3 extends lengthwise through roll 1 to form an annular clearance space with the inner circumference 4 of the hollow roll 1, such that the crosshead can move inside the hollow roll 1 without contacting the inner circumference 4. The ends of the hollow roll 1 may be supported on the crosshead 3 by bearings (not shown). In this case, the displacement of the crosshead 3 inside the hollow roll 1 is in the form of bending or flexure. In an alternative roll embodiment, which is referred to as a roll provided with an "inner stroke", the hollow roll 1 may shift, as a whole, relative to the crosshead 3 in the active plane. In this case, the ends of hollow roll 1 are not supported on the crosshead 3 by bearings, but rather are guided for radial movement in the active plane. In addition to the guided radial displacement, bending or flexure of the crosshead within the hollow roll also occurs. The necks 21 of the top roller 10, as well as the ends 5 of the crosshead 3, which protrude from the hollow roll 1, are secured in a suitable support such as a roll housing (not shown).

On the top 3' of crosshead 3 facing the roll nip 31 several hydraulic support elements 14—in the illustrated embodiment, nine,—are distributed over the length of the hollow roll. Each support element has a contact surface 24 matching or conforming in shape with the inner circumference 4 of the hollow roll 1 for abutting same. Shallow bearing pockets 25 are formed in the major portion of the contact surface 24, such that only webs remain at the edges of the pockets. In the illustrated embodiments, the support element 14 has a circular cross-section. The contact surface 24 has a peripheral web 26 extending around the entire circumference, as well as a central web 27, such that two bearing pockets 25 of approximately semicircular shape are formed.

The support element 14 comprises an approximately cup-shaped housing 28 having an open side facing the crosshead 3 and a bottom 29. The bearing pockets 25 are provided on the underside of bottom 29. Near the edge of the housing 28, a gasket 17 is provided for sealingly guiding the housing 28 in a cylinder bore 18 of the crosshead, which may be formed as a radial blind bore. Along with the housing 28, the cylinder bore 18 forms a cylinder chamber 39, which can be supplied with a first pressurized fluid from outside the roll via feed line 38 in the crosshead 3. The pressurized fluid in cylinder chamber 39 passes into the bearing pockets 25 via throttling ports 33 disposed in the bottom 29 of the support element 14. Thereafter, the fluid flows from the bearing pocket 25 over the edge 26, which forms a part of the contact surface 24, to the outside. Therefore, in the portion of the contact surface 24 corresponding to the edge 26, a stable liquid film is formed on which the support element 14 braces the inner circumference 4 of the hollow roll 1.

In the center portion of the bottom 29, i.e., in the region of the center web 27, an angularly bent flexible tube 21 is provided, which leads into an inlet port 22 lying on the axis of the support element 14. From inlet 22, throttling ports 23 originate and lead into the two bearing pockets 25. A flexible hose 32 is slipped onto the flexible tube 21. Hose 32 spirals into the interior of the cup-shaped housing 28 and is connected with another flexible tube 34 located at the bottom of the cylinder chamber 18. Tube 34 communicates with a separate feed line 46 provided in the crosshead 3. A second pressurized fluid, supplied through feed line 46, is conducted into the bearing pockets 25 via the throttling ports 23 and, for example, may influence the temperature of the bearing pockets 25, which otherwise depends upon the temperature of the first pressurized fluid supplied via the feed line 38. The flexible hose 32 constitutes a movable part of the feed line 46 that enables pressurized fluid to be conducted from the crosshead 3 into the bearing pockets 25 of the support element 14 despite the radial shifting of the support element relative to the crosshead 3 that may occur.

Figure 2:
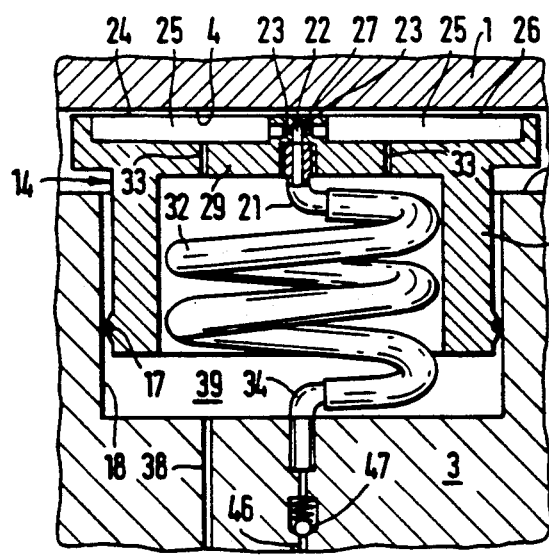
FIGS. 2 and 3 illustrate, in longitudinal section through the axis of the roll embodiments of an individual support element constructed according to the principles of the invention.
Figure 3:
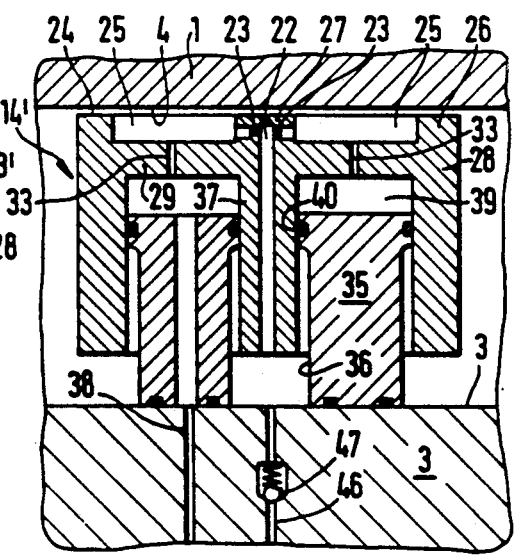

The parts of the support element 14' of FIG. 3 that correspond to similar parts of the support element 14 of FIG. 2 are designated with the same reference numerals. In this embodiment, the exterior of the cup-shaped housing 28 is not guided in a cylinder bore 18 of crosshead 3, but rather is guided at its interior by a piston 35 fixed to the top 3' of the crosshead 3. In this case, the cylinder chamber 39, which when pressurized forces the support element 14' against the inner circumference 4 of the hollow roll 1, lies between the top of piston 35 and the bottom 29 of housing 28. Piston 35 has a central bore 36, which communicates with the feed line 46. Bore 36 receives a tubular projection 37 extending from the bottom 29 into the bore 36, Which is sealed by means of a gasket 40. The tubular projection 37 and bore 36 form an additional piston/cylinder unit. Projection 37 includes a central bore at one end of which is located the inlet 22, which leads to the throttling ports 23. The support element 14' can move radially relative to the piston 35 provided on the top 3' of crosshead 3 in the same manner as the support element 14 can move in cylinder bore 18.

For both support elements 14, 14', a check valve 47 is provided in the additional feed line 46 to prevent pressurized fluid from flowing back out of the bearing pockets 25 via line 22 should a decrease in pressure occur.

One type of fluid supply for the support elements 14, 14', is illustrated in FIG. 1. Pump 12 draws pressurized fluid from a return tank 9 and supplies it, via the control unit 15 and feed line 38, to the individual support elements 14, 14'. To modify the line pressure generated, it also is possible to supply pressurized fluid to groups of support elements 14, 14' or even to each one of these support elements 14, 14' separately. Line 38, although shown symbolically as a single line, may in practice comprise several lines leading to individual groups of support elements or to individual support elements. Different pressures imparted in the control unit 15 may then be supplied to the groups of support elements or the individual support elements.

Pump 13 also draws pressurized fluid from the storage tank 9 and conducts it, via a control unit 16, to the feed line 46 from where it is supplied to the individual support elements 14, 14'. The pressurized fluid drawn by pump 13 is adjusted by the control unit 16 to a pressure which, of course, must be above the pressure prevailing in the bearing pockets 25, and to a predetermined temperature. The feed lines 46 also may be multiple lines for supplying groups of support elements 14, 14' or individual support elements 14, 14' with pressurized fluid. The pressurized fluid supplied to the individual support elements 14, 14' flows over the edges of the support elements 14, 14' into the clearance space 7 between crosshead 3 and inner circumference 4 of the hollow roll 1 and where it is conducted by a pump 11 via line 8 to return tank 9.

In FIGS. 4 to 7, several embodiments of the control unit 15, schematically shown in FIG. 1, are illustrated in greater detail. Parts of the control units of FIGS. 4-7 that function equivalently are designated with the same reference numerals. The control unit 16 of FIG. 4 comprises a manually operated flow regulator 50 for controlling the amount of fluids supplied. For each of the nine support elements 14' of roll 100, a slide regulator 51 is provided for adjusting the speed of rotation of the motor 52 of the pump 13 or the pump parts associated with the respective support element 14'. The respective pump 13 may be a forced feed pump that draws pressurized fluid from the return tank 9. The fluid is adjusted in a heat exchanger 48 to a predetermined temperature differing from the temperature of the first pressurized fluid delivered by pump 12. Depending on the amount of the second pressurized fluid supplied to the individual support elements 14', a significant influence on the temperature in the region of the support element 14 may be effectuated. The temperature of the first pressurized fluid delivered by pump 12 may be in the range of room temperature or it may be increased to about 280° to 300° C., for example, if the roll 100 is used for compacting thermoplastic fiber mat.

Figure 4:
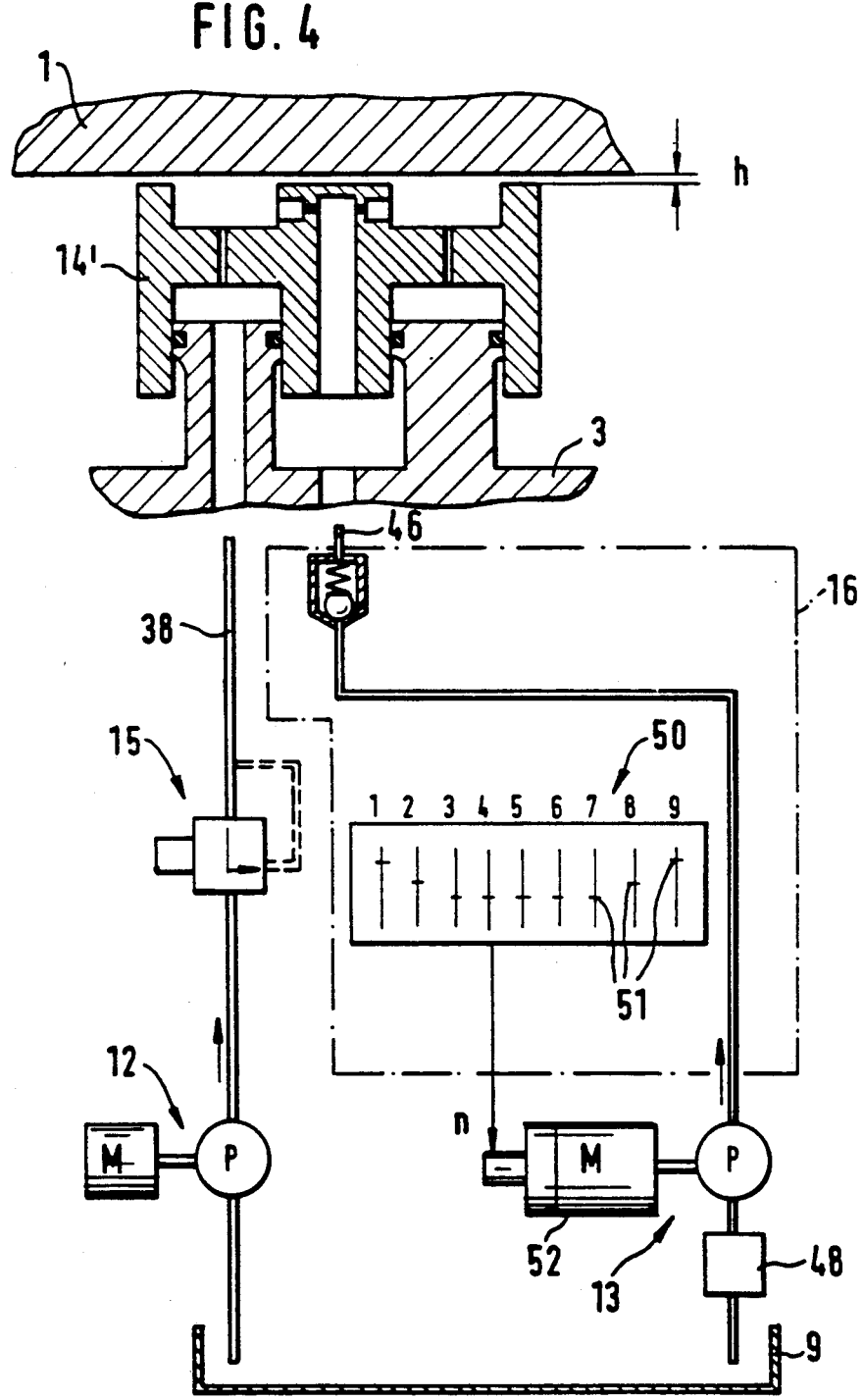
FIGS. 4 to 7 schematically depict various embodiments for controlling an additionally supplied pressurized fluid.

The temperature control at the circumference of roll 100 occurs according to FIG. 4 by hand through appropriate displacement of the slide members 51. The amount of displacement may be determined by empirical values accessible to the operator.

Figure 5:
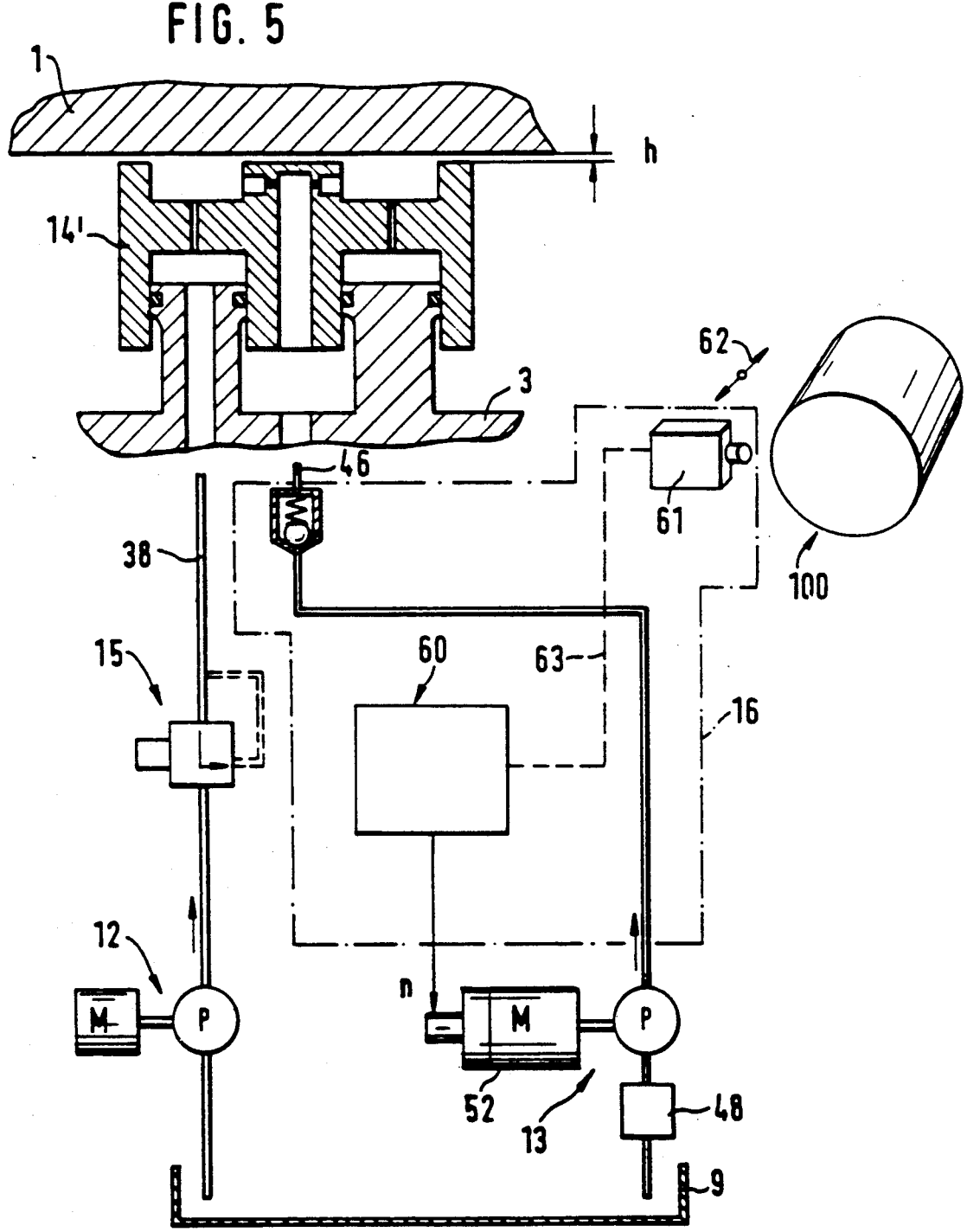

In the embodiment of FIG. 5, an experienced operator no longer is needed. A temperature sensor system 61, e.g., a radiation thermometer or the like, moves back and forth along roll 100 in the direction of the arrow. The sensed values are input as electrical signals via line 63 to a computer 60, which contains a program corresponding to the empirical values of the operator discussed in the embodiment of FIG. 4. From the deviations of the sensed temperature measured along roll 100 with a desired temperature and from the effects—previously established mathematically or empirically—of a certain change in the amount of the second pressurized fluid supplied, the computer 60 forms a set point for the motor 52 of each of the pumps 13 or the pump parts associated with the individual support elements 14'. In this manner, corresponding amounts of the second pressurized fluid, temperature-controlled in the heat exchanger 48, are automatically supplied to the individual support elements 14.

Figure 6:
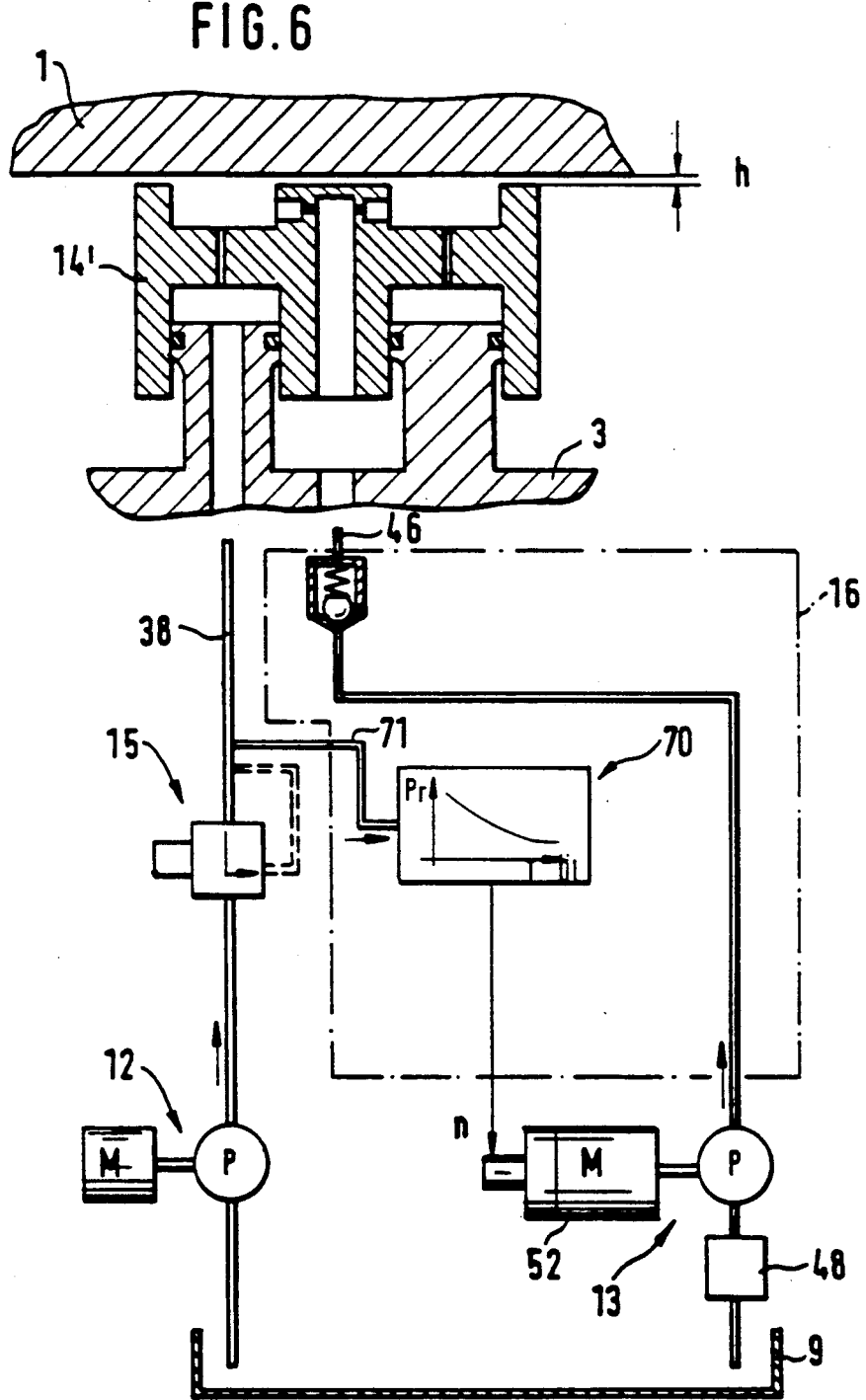

The embodiment of FIG. 6 goes still a step farther. Here again, a computer 70 is provided for controlling the drive motor 52 of the individual pumps 13 and supplying corresponding amounts of the second pressurized fluid, temperature-controlled in heat exchanger 48, to the support elements 14'. In contrast to the embodiment of FIG. 5, the embodiment of FIG. 6 does not require the temperature of the roll to be measured, as the program stored in computer 70—indicated by the small diagram in the square box symbolizing the computer 70—is so comprehensive as to contain the temperature effects that occur at certain pressure changes attributable to fluid friction in its broadest sense Therefore, the program already accounts for the temperature errors that the temperature sensor 61 of FIG. 5 might detect. Thus, the computer 70 "knows" which corrections it must carry out based upon the sensed contact pressure, which is input via line 71, to maintain the desired temperature distribution resulting from the primary pressurized fluid conveyed by pump 12.

Figure 7:
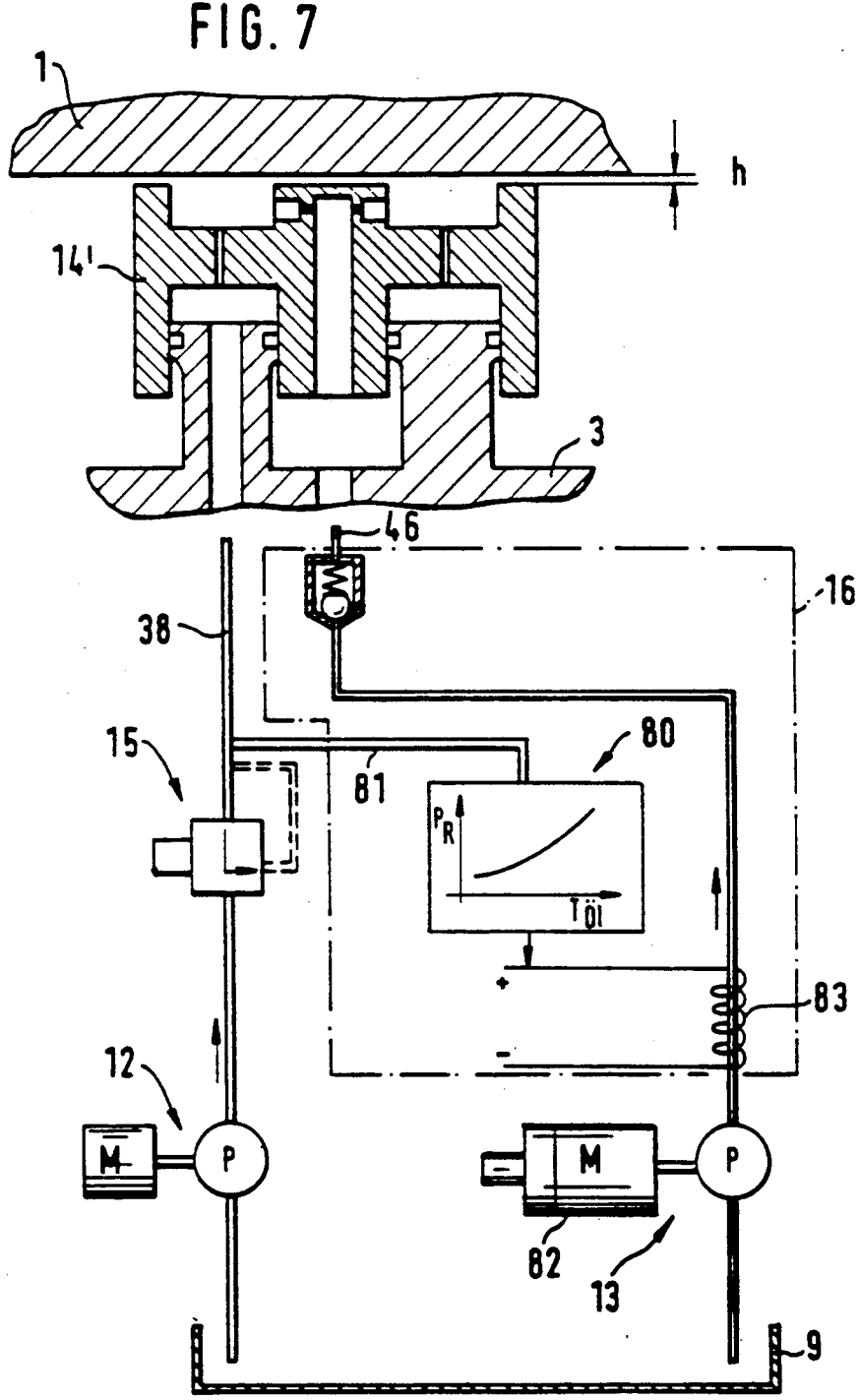

In the embodiments of FIGS. 4 to 6, the temperature of the second pressurized fluid additionally supplied to the bearing pockets is maintained at a constant temperature different than the temperature of the primary pressure fluid delivered by pump 12. Controlled amounts of this second source of pressurized fluid ar additionally fed to the bearing pockets. In the embodiment of FIG. 7, on the other hand, the pump 13, associated with each support element 14' (or groups of support elements) and driven by the uncontrolled motor 82, delivers a constant flow or amount of pressurized fluid over time to the bearing pockets 25 of the support element 14'. A computer 80 is provided, which contains a program as comprehensive as that of the computer 70 described above. Computer 80 controls a temperature-controlling system 83, shown in the indicated embodiment as a resistance heating element having a wire coil. As a function of the contact pressure of the support elements 14', the signal of which is input into the computer 80 via line 81, computer 80 controls the temperature-controlling device B3 such that the constant amount of fluid supplied to the support element 14' is heated to a predetermined degree to control the temperature distribution of the roll. The temperature-controlling device 83 need not necessarily be a heating device, but rather may be a cooling device.

What is claimed is:

1. A flexure-controllable roll comprising:
   a rotatable hollow roll forming a working roll circumference;
   a stationary crosshead extending lengthwise through the hollow roll;
   a surrounding clearance space formed between an inner circumference of the hollow roll and the crosshead;
   a plurality of hydrostatic support elements arranged along the crosshead, each hydrostatic support element having:
   a contact surface conforming to the inner circumference of the hollow roll;
   (b) at least one piston/cylinder unit including a piston and cylinder chamber for radially displacing the hydrostatic support element relative to the crosshead, said cylinder chamber containing a first pressurized fluid during operation of the roll for pressing the contact surface against the inner circumference of the hollow roll;
   (c) at least one bearing pocket formed in said contact surface;
   (d) a first throttling port in fluid communication with said at least one bearing pocket and said cylinder chamber for supplying the first pressurized fluid to said at least one bearing pocket, said first pressurized fluid in said at least one bearing pocket having a first temperature and a first pressure during operation of the roll;
   (e) a separate feed line communicating with a second pressurized fluid during operation of the roll, said second pressurized fluid having a second pressure greater than said first pressure and a second temperature different from said first temperature; and
   (f) a second throttle part in fluid communication with said at least one bearing pocket and said separate feed line to supply a quantity of said second pressurized fluid to said at least one bearing pocket and adjust the temperature therein independently of pressure changes in the hydrostatic support elements.

2. The roll of claim 1 wherein each separate feed line comprises a movable flexible tube extending from the crosshead to its respective support element.

3. The roll of claim 1 wherein each separate feed line comprises a telescoping part movable relative to one of said crosshead and its respective support element.

4. The roll of claim 3 and further comprising
   at least one additional piston/cylinder unit actuatable with pressurized fluid separately from said at least one piston/cylinder unit with one of the piston and cylinder of the additional piston/cylinder unit being connected with the support element and the other being connected with the crosshead;
   a bore formed at the crosshead in fluid communication with said separate feed line; and
   said telescoping part comprises a tubular projection extending into said bore from the side of the support element that faces the crosshead, said bore movably and sealingly receiving said tubular projection.

5. The roll of claim 1 wherein said at least one bearing pocket comprises a plurality of bearing pockets separated from each other by a central web, said separate feed line extending into the web and communicating with said plurality of bearing pockets via lateral throttling ports formed in said central web.

6. The roll of claim 1 further comprising a flow regulator associated with each support element for controlling the amount of second pressurized fluid supplied to its respective bearing pocket and a heat exchanger for maintaining said second pressurized fluid at a predetermined constant temperature.

7. The roll of claim 1 further comprising a temperature regulator associated with each support element for controlling the temperature of the second pressurized fluid and a constant flow pump for supplying said second pressurized fluid at a predetermined constant rate of flow to its associated bearing pocket.

8. The roll of claim 6 wherein said flow regulators are manually operable.

9. The roll of claim 7 wherein said temperature regulators are manually operable 10. The roll of claim 6 further comprising a temperature sensor system for sensing the temperature distribution of the roll and generating a signal indicative thereof and a computer receiving said signal and controlling the flow of the second pressurized fluid in response to said signal and a previously entered program.

11. The roll of claim 6 further comprising an input signal representative of the pressure level in said at least one bearing pocket and a computer receiving said input signal and controlling the flow of the second pressurized fluid in response thereto.

12. The roll of claim 7 further comprising an input signal representative of the pressure level in said at least one bearing packet and a computer receiving said input signal and controlling the temperature of the second pressurized fluid in response thereto.

* * * * *

UNITED STATES PATENT AND TRADEMARK OFFICE
CERTIFICATE OF CORRECTION

PATENT NO. : 5,101,544
DATED : April 7, 1992
INVENTOR(S) : Klaus KUBIK

It is certified that error appears in the above-identified patent and that said Letters Patent is hereby corrected as shown below:

```
Column 4, line 36, change "roll embodiments" to
                  --roll, two embodiments--.

Column 6, line 5, change "Which" to --which--.

Column 7, line 53, change "ar" to --are--;

line 68, change "B3" to --83--.

Column 8, line 18, change "a" to --(a) a--.
```

Signed and Sealed this

Seventh Day of September, 1993

Attest:

BRUCE LEHMAN

Attesting Officer     Commissioner of Patents and Trademarks